United States Patent [19]

Leites et al.

[11] Patent Number: 5,066,314
[45] Date of Patent: Nov. 19, 1991

[54] METHOD OF REMOVAL OF ACID COMPONENTS FROM A GAS

[75] Inventors: Iosif L. Leites; Yulya G. Karpova; Vladimir M. Berchenko, all of Moscow, U.S.S.R.; Takeshi Hihara, Zushi, Japan; Toshimitsu Shimizu, Yokohama, Japan; Norio Takahashi; Isamu Ueno, both of Yokosuka, Japan

[73] Assignees: State Scientific-Research Designing Institute for Nitrogen Industry and for Products of Organic Synthesis, Moscow, U.S.S.R.; Toho Kagaku Kogyo Co., Ltd, Tokyo, Japan

[21] Appl. No.: 549,967

[22] Filed: Jul. 9, 1990

[30] Foreign Application Priority Data

May 14, 1990 [JP] Japan .................................. 2-123754

[51] Int. Cl.[5] .......................... B01D 47/06; B01D 53/14
[52] U.S. Cl. ............................................. 55/44; 55/48; 55/53; 55/73
[58] Field of Search .................... 55/42, 44, 48, 53, 68, 55/73

[56] References Cited

U.S. PATENT DOCUMENTS

| | | | |
|---|---|---|---|
| 2,649,166 | 8/1953 | Porter et al. | 55/42 X |
| 2,826,266 | 3/1958 | Hachmuth et al. | 55/48 X |
| 2,926,753 | 3/1960 | Kohl et al. | 55/44 |
| 3,242,642 | 3/1966 | Miller et al. | 55/44 |
| 3,255,572 | 6/1966 | Miller et al. | 55/44 X |
| 3,383,838 | 5/1968 | Carson | 55/44 |
| 3,505,784 | 4/1970 | Hochgesand et al. | 55/44 |
| 3,594,985 | 7/1971 | Ameen et al. | 55/44 |
| 3,664,091 | 5/1972 | Hegwer | 55/48 X |
| 3,837,143 | 9/1974 | Sutherland et al. | 55/32 |
| 3,880,615 | 4/1975 | Grünewald et al. | 55/44 |
| 4,242,108 | 12/1980 | Nicholas et al. | 55/53 X |
| 4,302,220 | 11/1981 | Volkamer et al. | 55/48 X |
| 4,830,639 | 5/1989 | Grünewald et al. | 55/44 |

Primary Examiner—Robert Spitzer

[57] ABSTRACT

Method to remove acid components from a gas including to absorb those with an organic absorbent based on ethers of polyglycols at an elevated pressure followed by regeneration of the saturated absorbent and by dehydration of a part of the regenerated absorbent by heating, which is characterized in that the dehydration of the absorbent is carried out by the combination of stripping with a gas and heating at the temperature lower than the boiling point at 0.8 to 1.3 atm. by 80° to 150° C.

4 Claims, 1 Drawing Sheet

METHOD OF REMOVAL OF ACID COMPONENTS FROM A GAS

BACKGROUND OF THE INVENTION

1. Field of the Invention

This invention relates to a method of removal of acid components from a gas, and more particularly, a new and improved process for removal of carbon dioxide from gas mixtures.

2. Prior Art

In preparation of the gases for ammonia synthesis or of other products, it is necessary that a large quantity of carbon dioxide is removed from the initial gas mixture. In order to remove $CO_2$ from such gases, a physical absorption process is now very widely used which is based on utilization of ethers of polyglycols. The utilization of such solvents allows the investment and operation cost to be considerably cut compared with the known industrial processes of gas purification with ethanol amines and hot potash solutions (Spravochnik Azotchkika, 2nd issue, Moscow: Khimiya, 1986).

It is known that when ethers of polyglycols are used as absorbents of acid components, these solvents absorb also moisture from the gases to be treated and from the air used to strip acid components from saturated absorbents. But if the solutions of ethers of polyglycols contain water, this considerably reduces their absorption capacity for carbon dioxide. According to the experimental data obtained by the inventors, the $CO_2$ solubility in dimethyl ether of triethyleneglycol which contains 0 to 10 wt. % of water at the standard conditions (0° C. and 1 atm. or 760 mm Hg) decreases by 18% (see Table 1). At the other conditions, the solubility decreases similarly.

The decrease of the absorption capacity of an absorbent causes however an increase of the power consumption for its circulation as well as the deterioration of the carbon dioxide removal from the gas and the impossibility of the permanent maintenance of a constant composition of the gas purified.

TABLE 1

Carbon Dioxide Solubility ($Nm^3/m^3$) in Dimethyl Ether of Triethyleneglycol at Different Water Contents (0° C.)

| $CO_2$ partial pressure atm. | $H_2O$ content of absorbent, % wt. | | |
|---|---|---|---|
| | 0 | 5 | 10 |
| 1 | 2 | 3 | 4 |
| 1 | 7.7 | 7.2 | 6.3 |
| 2 | 15.2 | 14.2 | 12.5 |
| 4 | 30.8 | 28.3 | 25.3 |
| 6 | 46.3 | 42.6 | 38.0 |
| 8 | 63.4 | 60.2 | 55.2 |
| 10 | 81.5 | 77.4 | 70.9 |

The technological calculations show that for an effective industrial operation of absorbents based on ethers of polyglycols, it is necessary the water content of the absorbents to be maintained at the minimum attainable level, 2 to 2.5 wt. %. According to this requirement, it is necessary the water to be permanently extracted from the operating circulating solutions of absorbents. It is known that this purpose is now attained by the methods as follows. The most widespread method is that according to U.S. Pat. No. 2,649,166 when a certain par of the degassed solvent extracted from the desorber bottom is delivered to the dehydration evaporator. To facilitate the water evaporation process and to minimize the possible decomposition and evaporation of the solvent, a vacuum ($P_{res}=60$ mm Hg) shall be maintained in the evaporation column at the evaporation temperature of 100° C.

The shortcoming of this method is considerable power consumptions to make vacuum for evaporation of water (see Table 4).

In U.S. Pat. No. 3,837,143 another method is described for removal of acid components from gases with esters of polyglycols where the whole circulating solvent which contains up to 10 wt. % of water is delivered for dehydration into an evaporation zone where it boils for evaporation of the water which it contains. This evaporation is realized with help of the steam generated within the system. The quantity of the vapor extracted from the stripper shall be equal to that of the water removed plus the excess quantity of water up to 50 wt. %. The water necessary according to the balance is extracted from the system, and the excess condensed returns back into the stripper. The shortcoming of this method is the necessity of heating the whole quantity of circulating absorbent up to a high temperature (e.g. the boiling point of dimethyl ether of triethyleneglycol which contains 10% of water is equal to 120° C.), which will cause an accelerated degradation of the organic solvent and, consequently, an increased consumption of reagents as well as additional heat losses while cooling and condensing excessive water vapor.

SUMMARY OF THE INVENTION

The object of this invention is the development of such a method of gas purification which would allow the consumption of power and reagents for obtaining the purified gas to be cut while assuring the stability of its composition.

This object has been attained by the method of removal of acid components from a gas which includes their absorption with organic solvent based on ethers of polyglycols followed by the regeneration of the absorbent and dehydration of a part of the regenerated absorbent by heating, which according to the invention is characterized in the fact that the dehydration of the absorbent is carried out by the combination of stripping with a gas and heating at the temperatures which are lower than the boiling point of the absorbent approximately at atmospheric pressure by 80° to 150° C., in which a gas such as air, nitrogen, hydrogen, argon, methane or the mixture thereof is used as a stripping gas.

BRIEF DESCRIPTION OF THE DRAWING

FIGURE shows a block diagram of the system according to the present invention.

DETAILED DESCRIPTION OF THE INVENTION

Figure 1:
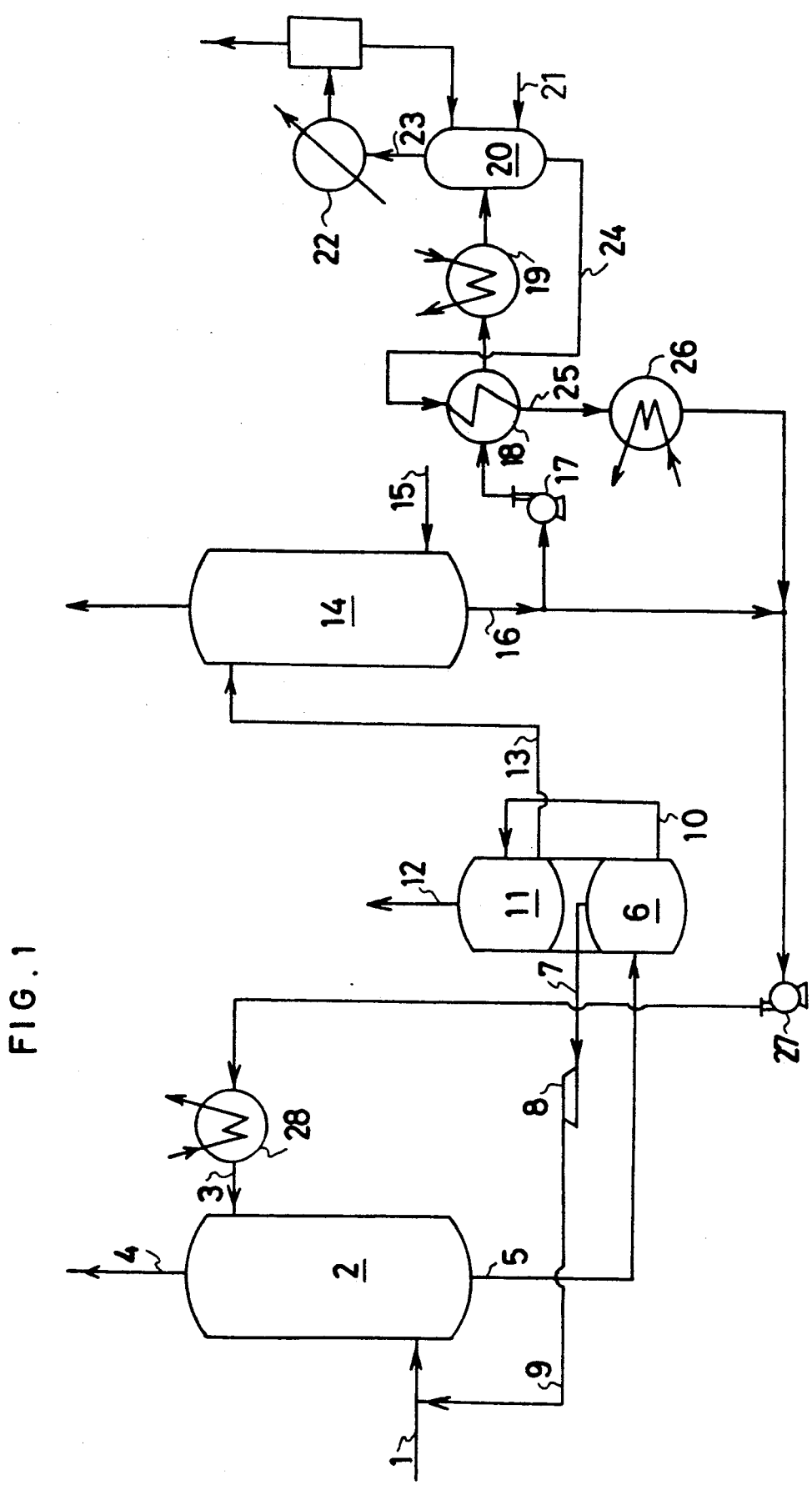

The substantial advantages of the method proposed include the possibility of assuring a deep dehydration of the circulating absorbent at its minimum losses and minimum power consumptions. Thus, the inventors of this invention have obtained experimental data on the degree and rate of dehydration of dimethyl ether of triethyleneglycol and other ethers at different conditions, several of these data being given in Table 2.

TABLE 2

| Time of experiment, hours | Water concentration in the solvent, % wt. | | | |
|---|---|---|---|---|
| | With no stripping | | With stripping with air | |
| | t of dehydration (°C.) | | | |
| | 125 | 100 | 100 | 90 |
| 0 | 3.2 | 3.0 | 10 | 10 |
| 2 | — | — | 3.6 | 3.9 |
| 4 | 3.16 | 3.0 | 1.0 | 1.9 |
| 6 | 3.1 | — | 0.31 | 0.58 |
| 8 | — | 3.01 | — | 0.28 |

As shown by the experimental data, when the dehydration is carried out at the atmospheric pressure, the temperature shall be increased up to the level higher than 100° C. to remove moisture with no stripping, but in the conditions with stripping the dehydration takes place with success at the temperatures lower than 100° C.

The inventors have obtained the experimental data on the degradation rate of both pure ethers of polyglycols and their mixtures at different temperatures (see Table 3). These data show that when the heating temperature increases from 90° to 130° C., the quantity of degradation products rises from 0.76 to 2.1 wt. % in 200 hours. While carrying out the dehydration at high temperatures in an industrial process, this will cause considerable losses of an expensive organic solvent.

TABLE 3

| Temperature of heating, °C. (during 200 h) | Composition of ether of polyglycol, % wt. | | |
|---|---|---|---|
| | Non-identified impurities | | Main substance |
| | $X_1$ | $X_2$ | $CH_3(OC_2H_4)_3OCH_3$ |
| Initial composition | 0.05 | 0.62 | 99.3 |
| 90 | 0.1 | 0.66 | 99.24 |
| 130 | 0.48 | 1.62 | 97.9 |

As an example, the inventors of this invention have calculated the power consumption for the dehydration process of dimethyl ether of triethyleneglycol according to the method described in U.S. Pat. No. 2,649,166 developed by the inventors when 200 kg of water per hour is removed from the solvent (see Table 4).

TABLE 4

| Nos. | Description of characteristics | Method described in U.S. Pat. No. 2,649,166 | Invention proposed |
|---|---|---|---|
| 1. | Temperature of dehydration, °C. | 100 | 90 to 70 |
| 2. | Power consumption, KW | | |
| | for vacuum | 50 | — |
| | for stripping | — | 10 |

As seen from the calculation given, the power consumption in the invention proposed is 5 times as low as that according to the known method.

In conformity with this invention, the method of removal of carbon dioxide from a gas is carried out as follows (see FIGURE). Natural or process gas which contains carbon dioxide and steam (the latter in the quantity which corresponds to the full or partial saturation of the gas at the given pressure and temperature) goes through line (1) into absorption zone (2) under an elevated pressure. The solvent which is an ether of polyglycol or a mixture of ethers of polyglycols and contains up to 5 wt. % of water, preferably up to 2.5 wt. %, is delivered into absorber (2) top through line (3) in the quantity which is sufficient to decrease the carbon dioxide content of the gas down to the level less than 0.15 vol. %, preferably 0.1 vol. %, at the temperature which is preferably lower than 20° C.

The circulation rate of the absorbent which is necessary to achieve the required degree of gas purification from carbon dioxide may be different depending on the temperature and pressure of the feed gas as well as on the temperature and water content of the solvent.

The gas purified from carbon dioxide and leaving absorber (2) top is extracted from the unit through line (4). The solvent which has absorbed carbon dioxide and water from the gas to be purified is extracted from the absorber through pipeline (5) and is delivered into 1st stage expander (6) where the pressure is maintained at a level lower than that of the absorber. This pressure should preferably be equal to 0.2 to 0.4 of that in the absorber.

The gas released in the 1st stage expander is exhausted through pipeline (7) and by compressor (8) is delivered through pipeline (9) back into absorber (2). The solvent from the 1st stage expander is exhausted through pipeline (10) and is delivered into 2nd stage expander (11) where the pressure is maintained at a level lower than that of the 1st stage expander. This pressure should preferably be equal to 1.1 to 1.9 ata. The gas released in the 2nd stage expander and consisting mainly of carbon dioxide (98 to 99 vo. % of $CO_2$) is exhausted from the unit through pipeline (12).

The partly regenerated solvent, after removal of the main quantity of carbon dioxide in the 2nd stage expander (11), goes through pipeline (13) into desorber (14) for final regeneration. Into desorber (14) bottom through pipeline (15), a stripping gas (e.g. air or nitrogen) is delivered in the quantity which corresponds to 5 to 10 volumes of the gas per 1 volume of the incoming liquid, preferably 8 volumes of the gas per 1 volume of the incoming liquid.

In desorber (14), while stripping with a gas, the final desorption of carbon dioxide from the solvent takes place, the residual $CO_2$ content of the regenerated solvent having not to be more than 0.5 $Nm^3/m^3$.

A certain part (0.1 to 2%) of the regenerated absorbent extracted from desorber (14) bottom through pipeline (16) is delivered by pump (17) into heat exchanger (18) where a heating takes place by the heat of the solvent after dehydration and then into preheater (19) where the absorbent is heated with steam or condensate up to the temperature of dehydration i.e. 80° to 150° C. which is lower than the boiling point of the absorbent used for absorption. Then the absorbent is delivered into dehydration vessel (20) where the heated absorbent is stripped by a gas.

The function of the dehydration vessel consists in evaporation of water from the incoming regenerated solvent. Its design may be either traditional as a packed or plate-type column or as a film-type tubular vessel in which the liquid flows down as a film to meet an upward flow of the stripping gas (21). The dehydration is carried out at the pressure near to the atmospheric one, preferably 1.1 ata.

The operating conditions of the dehydration vessel are determined in such a way that the quantity of moisture in the stripping gas would correspond to that of moisture removed from the system.

The whole sorbent carried away with the stripping gas is condensed in partial condenser (22) so that the gas (23) leaving the dehydration unit (20) does not practically contain solvent vapor and, consequently, there will be practically no losses of solvent from the system.

The absorbent, after removal of moisture from it, is extracted from dehydration vessel (20) bottom through pipeline (24) after which it enters heat exchanger (18) where it gives the most its heat to the solvent going to dehydration and then through pipeline (25) enters cooler (26) where it is cooled down to the temperature lower than 25° C. The cooled dehydrated solvent is mixed with the regenerated absorbent leaving desorber (14) after which the whole absorbent is delivered with pump (27) through ammonia cooler (28) and pipeline (3) into absorber (2) top.

EXAMPLE 1

A gas mixture in the quantity of 200 000 Nm$^3$ at the temperature of 10° C. and pressure of 30 ata is introduced into the absorber bottom, this mixture having the composition as follows.

| Composition of the gas, % vol. | |
|---|---|
| Hydrogen | 59 |
| Nitrogen | 20 |
| Carbon dioxide | 18 |
| Argon, methane, and carbon monoxide | 3 |
| Water in the gas mixture | 0.0005 Nm$^3$/Nm$^3$ |

Dimethyl ether of triethyleneglycol (boiling point 220° C.) which contains 2.5 wt. % of water is pumped at −5° C. into the absorber top where the pressure of 30 ata is maintained. The absorbent flowrate is 1900 m$^3$/hour. The purified gas which contains 0.1 vol. % of CO$_2$ is extracted from the absorber top.

The saturated solvent which contains carbon dioxide is extracted at +3° C. from the absorber bottom and is delivered into the 1st stage expander where the pressure of 6 ata is maintained. As a result of desorption of a part of dissolved gases from the solution on decreasing the pressure, the temperature of the saturated solvent drops and attains +2° C. The gas released in the 1st stage expander (2800 Nm$^3$/hour) and containing the most absorbed hydrogen and nitrogen (H$_2$ —25.0, N$_2$ —22.0, CO$_2$ —53.0 vol. %) is delivered to the compressor suction and returns into the absorber.

The solvent enters then the 2nd stage expander where the pressure of 1.5 ata is maintained. Here the desorption of the main quantity of absorbed carbon dioxide takes place (the composition of the outgoing fraction, % vol., is: CO$_2$—98.8, H$_2$—0.5, N$_2$—0.7, the quantity is 25,000 Nm$^3$/hour). On desorption, the solvent is cooled down to −1° C. and enters the desorber where the pressure of 1.2 ata is maintained. Into the desorber bottom, 13,000 Nm$^3$ of air is delivered at the ambient temperature. The water content of the air is 0.0162 Nm$^3$/Nm$^3$. The air and carbon dioxide are extracted from the desorber top. The degassed solvent is taken from the desorber bottom. Its part, in the quantity of 10 m$^3$/hour, is delivered into a heat exchanger, then into a preheater where it is preheated up to 90° C., and further into the dehydration vessel where the pressure of 1.1 ata is maintained. While stripping the hot solution with dry air, the evaporation and removal of 250 kg/hour of water take place, i.e. the quantity of moisture which enters this system with the gas to be purified and with the air used for degassing.

To condense the solvent vapor from the outgoing stripping air, this air passes through a condenser where it is cooled down to 60° C. The dehydrated solvent (10 m$^3$/hour) goes through a heat exchanger, then through a cooler where it is cooled down to 30° C., then is mixed with the main quantity of the regenerated solvent, and is pumped into an ammonia cooler where it is cooled down to −5° C. and then is delivered into the absorber top.

EXAMPLE 2

A gas mixture in the quantity of 100,000 Nm$^3$/hour, at the temperature of 15° C. and pressure of 50 ata, is introduced into the absorber bottom, the composition of the mixture being as follows:

| Composition of the gas, % vol. | |
|---|---|
| Hydrogen | 51 |
| Nitrogen | 20 |
| Carbon dioxide | 25 |
| Argon, methane, and carbon monoxide | 4 |
| Water in the gas mixture | 0.0006 Nm$^3$/Nm$^3$ |

Dimethyl ether of diethyleneglycol (boiling point 160° C.) which contains 2 wt. % of water is pumped at −10° C. into the absorber top where the pressure of 50 ata is maintained. The absorbent flowrate is 1,000 m$^3$/hour. The purified gas which contains 0.15 vol. % of CO$_2$ is extracted from the absorber top.

The saturated solvent which contains carbon dioxide is extracted at 0° C. from the absorber bottom and is delivered into the 1st stage expander where the pressure of 10 ata is maintained. As a result of desorption of a part of dissolved gases from the solution on decreasing the pressure, the temperature of the saturated solvent drops and attains −1° C. The gas released in the 1st stage expander (1.600 Nm$^3$/hour) and containing the most of absorbed hydrogen and nitrogen (H$_2$—27.0, N$_2$—21.2, CO$_2$—51.8 vol. %) is delivered to the compressor suction and returns into the absorber.

The solvent enters then the 2nd stage expander where the pressure of 1.3 ata is maintained. Here the desorption of the main quantity of absorbed carbon dioxide takes place (the composition of the outgoing fraction, % vol., is: CO$_2$—98.9, H$_2$—0.45, N$_2$—0.65, the quantity is 12,500 Nm$^3$/hour). On desorption, the solvent is cooled down to −6° C. and enters the desorber where the pressure of 1.15 ata is maintained.

Into the desorber bottom, 9,000 Nm$^3$/hour of nitrogen is delivered at the temperature of 20° C. The nitrogen and carbon dioxide are extracted from the desorber top. The degassed solvent is taken from the desorber bottom. Its part, in the quantity of 2.5 m$^3$/hour, is delivered into a heat exchanger, then into a preheater where it is preheated up to 80° C., and further into the dehydration vessel where the pressure of 1.05 ata is maintained. While stripping the hot solution with nitrogen, the evaporation and removal of 50 kg/hour of water take place, i.e. the quantity of moisture which enters this system with the gas to be purified.

To condense the solvent vapor from the outgoing stripping nitrogen, this nitrogen passes through a condenser where it is cooled down to 55° C. The dehydrated solvent (2.5 m$^3$/hour) goes through a heat exchanger, then through a cooler where it is cooled down to 30° C., then is mixed with the main quantity of the regenerated solvent, and is pumped into an ammonia cooler where it is cooled down to −10° C. and then is delivered into the absorber top.

EXAMPLE 3

A gas mixture in the quantity of 150,000 Nm$^3$/hour, at the temperature of 15° C. and pressure of 40 ata, is introduced into the absorber bottom, the composition of the mixture being as follows:

| Composition of the gas, % vol. | |
|---|---|
| Hydrogen | 57 |
| Nitrogen | 21 |
| Carbon dioxide | 19 |
| Argon, methane, and carbon monoxide | 3 |
| Water in the gas mixture | 0.0003 Nm$^3$/Nm$^3$ |

A mixture of dimethyl ethers of polyethyleneglycol with the number of glycol residuals in the molecule of 3 to 6 (boiling point 240° C.) which contains 3 wt. % of water is pumped at 0° C. into the absorber top where the pressure of 40 ata is maintained. The absorbent flowrate is 1,600 m$^3$/hour. The purified gas which contains 0.12 vol. % of $CO_2$ is extracted from the absorber top.

The saturated solvent which contains carbon dioxide is extracted at +8° C. from the absorber bottom and is delivered into the 1st stage expander where the pressure of 8 ata is maintained. As a result of desorption of a part of dissolved gases from the solution on decreasing the pressure, the temperature of the saturated solvent drops and attains +7° C. The gas released in the 1st stage expander (2,300 Nm$^3$/hour) and containing the most of absorbed hydrogen and nitrogen ($H_2$—31.5, $N_2$—24.3, $CO_2$—44.2 vol. %) is delivered to the compressor suction and returns into the absorber.

The solvent enters then the 2nd stage expander where the pressure of 1.6 ata is maintained. Here the desorption of the main quantity of absorbed carbon dioxide takes place (the composition of the outgoing fraction, % vol., is: $CO_2$—98.7, $H_2$—0.6, $N_2$—0.7, the quantity is 20,000 Nm$^3$/hour). On desorption, the solvent is cooled down to +4° C. and enters the desorber where the pressure of 1.3 ata is maintained.

Into the desorber bottom, 12,000 Nm$^3$/hour of nitrogen is delivered at the temperature of 20° C. The nitrogen and carbon dioxide are extracted from the desorber top. The degassed solvent is taken from the desorber bottom. Its part, in the quantity of 1.3 m$^3$/hour, is delivered into a heat exchanger, then into a preheater where it is preheated up to 90° C., and further into the dehydration vessel where the pressure of 1.15 ata is maintained. While stripping the hot solution with the gas which contains 24 vol. % of $CH_4$, 37 vol. % of $H_2$, 36 vol. % of $N_2$, and 3 vol. % of Ar, the evaporation and removal of 40 kg/hour of water takes place, i.e. the quantity of moisture which enters this system with the gas to be purified.

To condense the solvent vapor from the outgoing stripping gas, this gas passes through a condenser where it is cooled down to 58° C. The dehydrated solvent (1.3 m$^3$/hour) goes through a heat exchanger, then through a cooler where it is cooled down to 28° C., then is mixed with the main quantity of the regenerated solvent, and is pumped into an ammonia cooler where it is cooled down to 0° C. and then is delivered into the absorber top.

What is claimed is:

1. A method of removal of acid components from a gas mixture containing acid components using an organic absorbent based on ethers of polyglycols, comprising the sequential steps of:
   (a) absorbing acid components of the gas mixture in the absorbent by a countercurrent contact of the gas mixture and the absorbent under pressure in an absorber maintained at a temperature of less than 20° C.,
   (b) discharging the resulting gas mixture from a top of the absorber,
   (c) discharging the absorbent from a bottom of the absorber to an expander in which pressure is maintained lower than in the absorber, and discharging most of the acid components from the absorbent therein,
   (d) discharging said absorbent from the expander to a top of a desorber where pressure is maintained lower than in the expander,
   (e) discharging remaining acid components from the absorbent by a countercurrent of the absorbent and air or $N_2$ gas supplied at a bottom of the desorber to reduce an acid component of the absorbent to not more than 0.5 Nm$^2$m$^3$, and extracting the absorbent from the bottom of the desorber,
   (f) furnishing a major portion of said absorbent to a refrigerator, cooling the absorbent in said refrigerator to a temperature of less than 20° C., furnishing the absorbent from the refrigerator to the top of the absorber and contacting it with a new gas mixture containing acid components by a countercurrent,
   (g) furnishing a remaining amount of absorbent extracted from the bottom of the desorber, after being heated at a heating device, to the top of a dehydration vessel which is maintained at a temperature of 80°–150° C. and under a pressure of 0.8–1.3 atm, where moisture contained in the absorbent is discharged by countercurrent contact with a stripping gas, and
   (h) joining the resultant dehydrated absorbent with said major portion of the absorbent being furnished to the refrigerator.

2. The method of claim 1, wherein said stripping gas comprises at least one member selected from the group consisting of air, nitrogen, hydrogen, argon, and methane.

3. The method of claim 1, wherein said remaining amount of absorbent is 0.1–2.0% by weight based on a total amount of said absorbent.

4. The method of claim 1, wherein said dehydration vessel is maintained at 80°–120° C.

* * * * *